United States Patent
Ishii et al.

(10) Patent No.: US 6,580,224 B2
(45) Date of Patent: Jun. 17, 2003

(54) BACKLIGHT FOR COLOR LIQUID CRYSTAL, COLOR LIQUID CRYSTAL DISPLAY DEVICE, AND EL ELEMENT FOR BACKLIGHT OF COLOR LIQUID CRYSTAL DEVICE

(75) Inventors: Tsutomu Ishii, Shimada (JP); Mitsuo Nakamura, Yokohama (JP); Kiyoshi Inoue, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 205 days.

(21) Appl. No.: 09/873,400

(22) Filed: Jun. 5, 2001

(65) Prior Publication Data

US 2002/0003594 A1 Jan. 10, 2002

(30) Foreign Application Priority Data

Jun. 5, 2000 (JP) ........................................ 2000-167700

(51) Int. Cl.$^7$ .................................................. H01J 1/62
(52) U.S. Cl. ...................... 315/169.3; 313/503; 313/509
(58) Field of Search .................... 315/169.3; 313/503, 313/509

(56) References Cited

U.S. PATENT DOCUMENTS 5,834,894 A  * 11/1998 Shirasaki et al. ............ 313/509

FOREIGN PATENT DOCUMENTS

| JP | 07-043712 | 2/1995 |
| JP | 11-211864 | 8/1999 |

* cited by examiner

Primary Examiner—David Vu
(74) Attorney, Agent, or Firm—Foley & Lardner

(57) ABSTRACT

A backlight for color liquid crystal comprises a light-emitting layer having EL phosphor particles dispersed in a matrix of dielectrics, a transparent electrode layer disposed along a main surface on an emitting side of a light-emitting layer, and a reflective insulating layer and a rear electrode layer stacked in turn along a main surface on a non-emitting side of a light-emitting layer. An EL element, under the operational conditions of a voltage of 100 Vrms and a frequency of 400 Hz, emits white light of which brightness is 80 cd/m$^2$ or more, and has characteristics of consumption power of 30 W/m$^2$ or less. By the use of such EL element as a backlight, a color liquid crystal display device that is low in consumption power, excellent in display performance and suitable for a display portion of a portable information terminal can be provided.

16 Claims, 2 Drawing Sheets

BACKLIGHT FOR COLOR LIQUID CRYSTAL, COLOR LIQUID CRYSTAL DISPLAY DEVICE, AND EL ELEMENT FOR BACKLIGHT OF COLOR LIQUID CRYSTAL DEVICE

BACKGROUND OF THE INVENTION

1. Field of the Invention

The present invention relates to a backlight for a color liquid crystal display device, a color liquid crystal display device, and an EL element for a backlight of a color liquid crystal display device.

2. Description of the Related Art

Color liquid crystal display devices are used as display devices for computers, game machines and various kinds of home appliances. With the recent increase of various kinds of portable information terminals, a large number of liquid crystal display devices are used as display devices for the information terminals. In particular, also in PDA's (personal digital assistants) and portable telephones, color display has been forwarded. Accordingly, demands are strong for color liquid crystal display devices smaller and thinner in size, and lower in power consumption.

The liquid crystal display device, being a display device that does not emit light, is ordinarily provided with a backlight as a light-emitting source. For the backlight of the color liquid crystal display, cold-cathode tube is generally used. However, the cold-cathode tube, in addition to being large in power consumption, requires a large space for installation. As a result, it cannot be employed as the display portion of the portable information terminals such as PDA's and portable telephones. That is, for the display portion that requires smaller and thinner size and lower power consumption, a color liquid crystal display device having a backlight consisting of a cold-cathode tube cannot be applied.

From these reasons, in the portable information terminals, liquid crystal display devices having light-emitting diodes (LED's) or electroluminescent (EL) light-emitting elements are used. However, the LED, being a point light source, has disadvantages such as the tendency to cause unevenness or light leakage when displaying in a larger screen, or breakage under high load operation. Furthermore, when the LED is used as the backlight, a plurality of LED's are necessary according to a dimension of a display screen, a rise of the device cost being inevitably caused.

On the other hand, the EL element, being a surface light source, does not cause unevenness even when displaying in a larger screen, and furthermore, being light and thin to be high in freedom of shape, is excellent in space saving and lower in power consumption. Thus, since the EL element is superior as the backlight for the portable information terminal, a liquid crystal display device using an EL element as the backlight has been studied to apply in a portable information terminal (cf. Japanese Patent Laid-Open Application Nos. JP-A7-43712 and JP-A 11-211864, for instance).

In an ordinary EL element, a copper activated zinc sulfide phosphor is used as an EL phosphor. However, the copper activated zinc sulfide phosphor can emit only in from blue green to green color, resulting in inferior color reproducibility. Furthermore, the EL element is insufficient in brightness in comparison with the LED. In particular, white light of high brightness is necessary for the backlight of the color liquid crystal display device. However, the existing EL element is insufficient in white light reproducibility and brightness, as a result the EL element has never been put into practical use as the backlight of the color liquid display device.

For instance, in the above Japanese Patent Laid-Open Application No. JP-A 7-43712, as a backlight for a color liquid crystal display device, the use of a white-emitting EL lamp is disclosed. However, an EL light-emitting layer used here is formed by means of electron beam evaporation method, sputtering method, or CVD method, being different in its configuration from an EL element of organic dispersion type. Furthermore, on the basis of the difference of the configuration of the EL light-emitting layer or the like, a backlight disclosed in the above gazette cannot give white light of sufficient brightness.

On the other hand, in Japanese Patent Laid-Open Application No. JP-A 11-211864, it is disclosed that a color EL lamp in which a layer of a fluorescent pigment is formed as a coloring layer on a surface of the EL lamp is used as a backlight for a liquid crystal display device. The color EL lamp here is one to obtain a single color emission and is different in configuration from a white-emitting EL element demanded as a backlight for a color liquid crystal display device. Accordingly, with the color EL lamp disclosed in the above gazette, full-color display due to a liquid crystal display device cannot be realized.

SUMMARY OF THE INVENTION

Accordingly, an object of the present invention is to provide a backlight for color liquid crystal that, in addition to enabling to realize a high performance full color display due to a liquid crystal display device, is smaller and thinner to be excellent in space saving, lower in consumption power, and free from display unevenness and light leakage, and an EL element for a backlight of color liquid crystal. Furthermore, the other object of the present invention is, by the use of such backlight, to provide a color liquid crystal display device in which display unevenness and light leakage are prevented from occurring and of which display characteristics such as color reproducibility and brightness are improved.

A backlight for color liquid crystal of the present invention comprises a light-emitting layer, a transparent electrode layer and an EL element. In the above, the light-emitting layer comprises EL phosphor particles dispersed in a matrix of high dielectric constant. The transparent electrode is disposed along a main surface on a light-emitting side of the light-emitting layer. The EL element comprises a reflective insulating layer and a rear surface electrode layer stacked in turn along a main surface on a non-emitting side of the light-emitting layer. Here, the EL element, under operating conditions of a voltage of 100 Vrms and a frequency of 400 Hz, emits white light of brightness of 80 cd/m$^2$ or more and has a luminous efficiency of 30 W/m$^2$ or less in consumption power.

An EL element for a backlight of color liquid crystal of the present invention comprises a light-emitting layer, a transparent electrode layer, and a reflective insulating layer and a rear electrode layer. In the above, the light-emitting layer comprises EL phosphor particles dispersed in a matrix of high dielectric constant. The transparent electrode is disposed along a main surface on a light-emitting side of the light-emitting layer. The reflective insulating layer and rear electrode layer are stacked in turn along a main surface on a non-emitting side of the light-emitting layer. Here, the EL element, under operating conditions of a voltage of 100

Vrms and a frequency of 400 Hz, emits white light of brightness of 80 cd/m$^2$ or more and has a luminous efficiency of 30 W/m$^2$ or less in consumption power.

The EL element having the white light emission as mentioned above satisfies characteristics (reproducibility of white light and brightness) necessary for the backlight for liquid crystal. Accordingly, by the use of such EL element as the backlight, excellent color display due to a liquid crystal display device can be realized. That is, the color liquid crystal display device in which the EL element is used as the backlight can be put in practical use.

In addition to the above, by making the best use of the characteristics of the EL element of being small and thin, that is, excellent in space saving, and low in power consumption, the color liquid crystal display device can be made smaller and thinner in size, and lower in power consumption. Furthermore, the EL element, being a surface light source, does not cause display unevenness and light leakage. Accordingly, the color liquid crystal display device can be furthermore improved in its display characteristics.

In the present invention, for the EL phosphor, a copper activated zinc sulfide phosphor that emits mainly in blue green color (or blue color) is applied. In order to make the brightness of white emission due to the EL element 80 cd/m$^2$ or more, a copper activated zinc sulfide phosphor that has brightness of 100 cd/m$^2$ or more under the operating conditions of for instance a voltage of 100 Vrms and a frequency of 400 Hz is employed. In addition to the use of such high brightness copper activated zinc sulfide phosphor, the following configuration of the EL element is adopted to obtain white emission. Thereby, the white emission excellent in color reproducibility and high in brightness can be realized.

A specific configuration of an EL element for obtaining white emission is as follows. That is, a light-emitting layer of the EL element is preferable to comprise copper activated zinc sulfide phosphor particles and a fluorescent pigment. Here, the copper activated zinc sulfide phosphor particles emit in blue green or blue color. The fluorescent pigment absorbs emission from the copper activated zinc sulfide phosphor to emit in red color and is contained by 3 mass percent or more with respect to the copper activated zinc sulfide phosphor. In such light-emitting layer, the red fluorescent pigment is more preferable to be contained in the light-emitting layer in the range from 4 mass percent or more to 7 mass percent or less with respect to the copper activated zinc sulfide phosphor.

In the present invention, as another configuration of the EL element having white emission, a light-emitting layer of an EL element comprises copper activated zinc sulfide phosphor particles and a fluorescent pigment. Here, the copper activated zinc sulfide phosphor particles emit in blue green color or blue color. The fluorescent pigment absorbs emission from the copper activated zinc sulfide phosphor to emit in red color and is contained less than 2 mass percent with respect to the copper activated zinc sulfide phosphor. The EL element further comprises a red pigment layer. The red pigment layer is stacked on a transparent electrode film thereon the transparent electrode is formed and contains the fluorescent pigment of from 2 mass percent or more to 5 mass percent or less with respect to the copper activated zinc sulfide phosphor in the light-emitting layer.

A color liquid crystal display device of the present invention employs the EL element as mentioned above as a backlight. That is, the color liquid crystal display device of the present invention comprises the aforementioned backlight for the color liquid crystal of the present invention and a transmissive or reflective liquid crystal display element. The transmission or reflection type color liquid crystal display element is disposed on a light-emitting surface side of the aforementioned backlight.

In the color liquid crystal display device of the present invention, in order to increase an amount of light supplied to the color liquid crystal display element, it is effective to dispose, between the backlight and the color liquid crystal display element, a reflective optical retardation film to improve utility efficiency of white light emitted from the EL element. Furthermore, as a drive power source of the EL element, an inverter having an output of 150 Vpp or more and 300 Hz or more is used to enhance furthermore brightness of the white emission.

DESCRIPTION OF THE PREFERRED EMBODIMENTS

In the following, modes for implementing the present invention will be explained.

Figure 1:
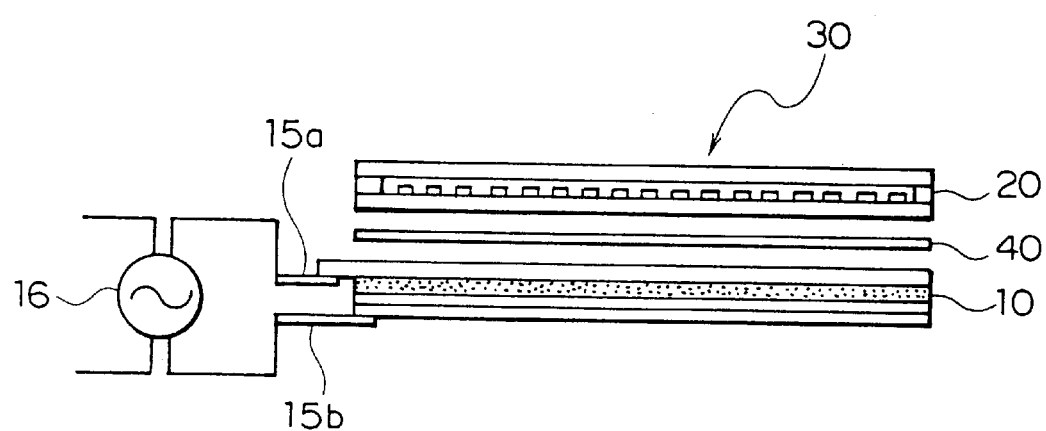
FIG. 1 is a diagram showing one example of configuration of a color liquid crystal display device in which a backlight for color liquid crystal according to one embodiment of the present invention is used.
Figure 2:
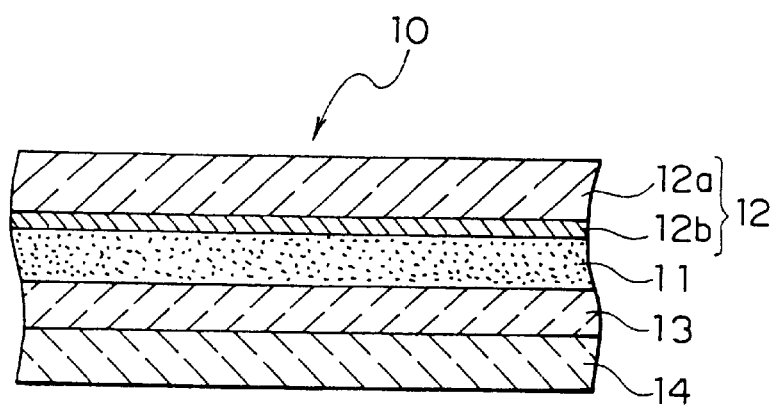
FIG. 2 is a sectional view showing one example of an essential structure of an EL element used as a backlight for color liquid crystal in FIG. 1.

FIG. 1 is a diagram showing a rough block diagram of a color liquid crystal display device that has a backlight for color liquid crystal according to one embodiment of the present invention, FIG. 2 being a sectional view showing one example of an essential structure of an EL element used as a backlight. In the figures, reference numeral 10 denotes an EL element (EL panel) as a backlight. On a light-emitting surface side of the EL element 10, a color liquid crystal display element 20 is disposed. From these, a color liquid crystal display device (color liquid crystal module) 30 is configured.

The EL element 10 comprises a light-emitting layer 11 that emits, upon an application of an electric field, white light. The light-emitting layer 11 contains EL phosphor particles as a primary electroluminescent light source. The EL phosphor particles consist of copper activated zinc sulfide phosphor particles for instance. Such EL phosphor particles are dispersed in a matrix of dielectrics consisting of organic polymer material of high dielectric constant such as for instance cyano-ethyl cellulose or fluororubber. That is, in the light-emitting layer 11, inorganic EL phosphor particles are dispersed in a matrix of organic dielectrics to constitute an organic dispersion type phosphor layer.

On a main surface on a light-emitting surface side of the light-emitting layer 11, a transparent electrode film 12 is integrally stacked. The transparent electrode film 12 is formed by depositing a transparent electrode 12b consisting of an ITO film or the like on a surface of a transparent insulating film 12a such as a polyester film. The ITO deposition film as the transparent electrode 12a is disposed at a position facing the light-emitting layer 11.

Furthermore, on the other main surface, that is a rear surface side that is a non-light emitting surface, of the light-emitting layer 11, a reflective insulating layer 13 is stacked to form. In the reflective insulating layer 13, inorganic oxide powder of high reflectivity and high dielectric constant such as for instance $TiO_2$ or $BaTiO_3$ is dispersed in organic polymer of high dielectric constant such as for instance cyano-ethyl cellulose or fluororubber. Through the reflective insulating layer 13, a rear electrode layer 14 is integrally stacked.

A primary emission color of the copper activated zinc sulfide phosphor (ZnS: Cu phosphor) is blue green. Accordingly, in order to obtain white as an emission color from the EL element 10, a red emission color component is indispensable. In the EL element 10 shown in FIG. 2, in the light-emitting layer 11 (specifically in the matrix of dielectrics), a fluorescent pigment is contained in the range of 3 mass percent or more with respect to the copper activated zinc sulfide phosphor. The fluorescent pigment absorbs the light emitted from the copper activated zinc sulfide phosphor to emit in red.

Thus, when in the light-emitting layer 11 essentially containing blue green or blue emitting copper activated zinc sulfide phosphor, a red fluorescent pigment that emits in red upon the absorption of the emission from the copper activated zinc sulfide phosphor is contained, the EL element 10 that emits in white can be realized. Furthermore, the EL element 10, on the basis of the aforementioned constituent elements each, satisfies luminous efficiency of power consumption being 30 $W/m^2$ or less. The white light emitted from the EL element 10 is preferable to have chromaticity coordinate values of x from 0.30 to 0.43 and of y from 0.27 to 0.41, in CIE chromaticity diagram (x, y). According to such white light, full color display due to the color liquid crystal display element 20 can be excellently realized.

However, when the copper activated zinc sulfide phosphor emitting in blue green or in blue and the red fluorescent pigment are simply concurrently used, there is the great risk that the brightness of the white light becomes insufficient. The white light of low brightness causes deterioration of display performance by means of the color liquid crystal display element 20. The reason why the existing EL element was not put into practical use as the backlight of the color liquid crystal display device is primarily due to a fact that in the existing EL element the white light of high brightness cannot be obtained with good reproducibility.

In the present invention, as the EL phosphor particles, the copper activated zinc sulfide phosphor of high brightness is applied. Specifically, it is preferable to use the copper activated zinc sulfide phosphor having the brightness of 100 $cd/m^2$ or more under the operational conditions of a voltage of 100 Vrms and a frequency of 400 Hz. The brightness of the copper activated zinc sulfide phosphor here denotes the brightness when the light-emitting layer is formed by the copper activated zinc sulfide phosphor alone and the EL element having such light-emitting layer is operated under the aforementioned operational conditions. Furthermore, for the emission color of the copper activated zinc sulfide phosphor, the CIE chromaticity coordinate values (x, y) are preferable for x to be in the ranges from 0.17 to 0.19 and for y to be from 0.35 to 0.47, respectively.

In addition to the use of the blue green or blue emitting copper activated zinc sulfide phosphor of high brightness as mentioned above, the fluorescent pigment that absorbs the emission from the above phosphor to emit in red is used together to constitute the light-emitting layer 11. Thereby, when the EL element 10 is operated under the conditions of a voltage of 100 Vrms and a frequency of 400 Hz, the white light having the brightness of 80 $cd/m^2$ or more can be obtained with excellent reproducibility. In other words, the white light satisfying the chromaticity and brightness necessary for the backlight of the color liquid crystal display device 20, by means of the EL element 10, can be realized with reproducibility. Thus, in the EL element 10 used as the backlight for the color liquid crystal, in view of an improvement of the brightness of the white emission, it is important to make brighter the copper activated zinc sulfide phosphor itself.

To make brighter the copper activated zinc sulfide phosphor, it is effective to implement the configuration in which an amount of for instance alkaline earth metal elements (Mg, Ca, Sr, Ba and so on) remaining in the copper activated zinc sulfide phosphor (ZnS: Cu phosphor) is reduced and a slight amount of Cs is added. Cs is preferably contained in the range from 0.0001 to 0.01 mass percent with respect to the ZnS: Cu phosphor. According to such configuration, the aforementioned copper activated zinc sulfide phosphor of high brightness can be obtained with good reproducibility.

Furthermore, as a specific composition of the copper activated zinc sulfide phosphor, a composition (high brightness composition) such as a copper and chlorine activated zinc sulfide phosphor (ZnS: Cu, Cl), or a copper, manganese and chlorine activated zinc sulfide phosphor (ZnS: Cu, Mn, Cl) can be effectively applied. In the ZnS: Cu, Cl phosphor, a copper content is preferable to be in the range from 0.01 to 0.12 mass percent, that of Cl being preferable to be in the range from 0.001 to 0.10 mass percent. By the application of such composition, in particular, a luminous efficiency of the EL phosphor can be heightened.

In the following, a configuration of the light-emitting layer 11 of the EL element 10 will be detailed. As mentioned above, a copper activated zinc sulfide phosphor of high brightness and a red fluorescent pigment that emits in red upon the absorption of blue green or blue light from the copper activated zinc sulfide phosphor are mixed and the obtained mixture is dispersed in the light-emitting layer 11. Thereby, white light excellent in brightness and chromaticity can be obtained. At that time, the red fluorescent pigment of 3 mass percent or more is added to the copper activated zinc sulfide phosphor, thereby white light practically usable as the backlight for color liquid crystal being obtained.

Figure 3:
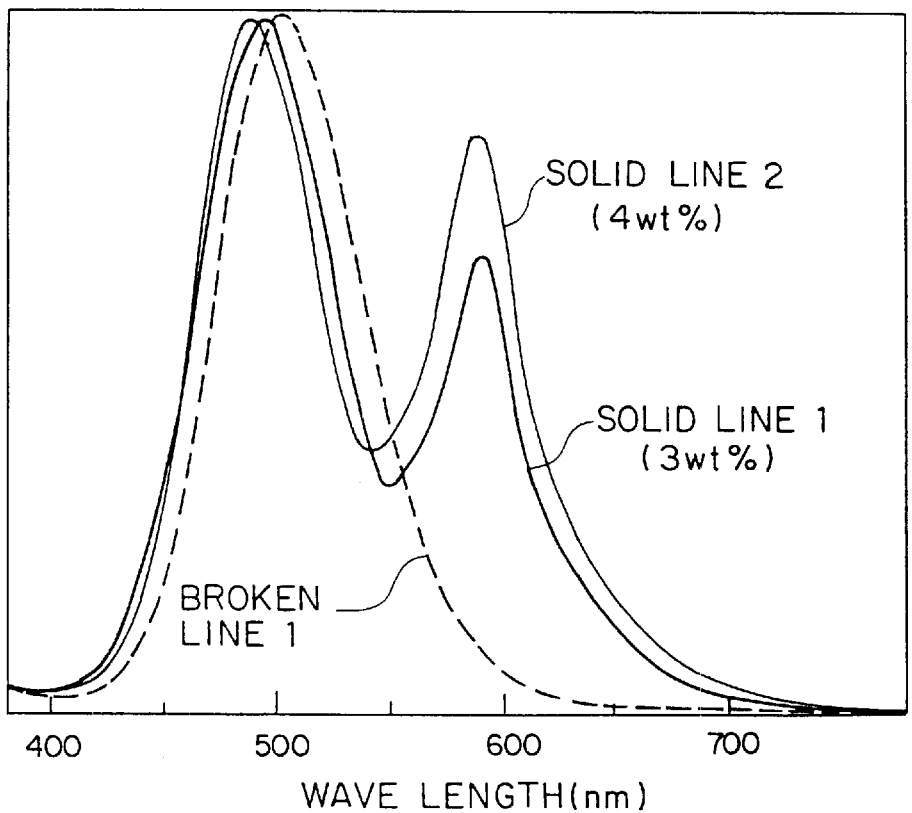
FIG. 3 shows emission spectra of EL elements having phosphor layers each in which 3, 4 and zero mass percent of rhodamine group fluorescent pigment are added to a copper activated zinc sulfide phosphor emitting in blue green color.

FIG. 3 shows emission spectra of the EL elements 10 having various kinds of light-emitting layers 11. In FIG. 3, a solid line 1 shows an emission spectrum of the EL element 10 having the light-emitting layer 11 in which 3 mass percent of a rhodamine group pigment as a fluorescent pigment is mixed with the copper activated zinc sulfide phosphor. The rhodamine group pigment as a fluorescent pigment emits in red upon the absorption of blue green emission. On the other hand, a broken line 1 shows an emission spectrum of the EL element having a light-emitting layer containing only the blue green emitting copper activated zinc sulfide phosphor.

The rhodamine group fluorescent pigment is organic one that absorbs, of blue green light emitted from the copper activated zinc sulfide phosphor, EL emission in the wavelength region of 550 nm or less to emit in red. Such fluorescent pigment is mixed in the range of 3 mass percent or more with respect to the copper activated zinc sulfide phosphor, thereby practical white light being obtained.

That is, the emission spectrum shown by the solid line 1 in FIG. 3 comprises, in addition to an emission peak in the vicinity of 500 nm, that in the vicinity of 600 nm. From this, it is understood that in the EL element 10 of the present invention a red component is partially added. Furthermore, a ratio of a peak value of red emission to that of blue green emission is 60 percent or more, therefrom it can be understood that the practical white light is obtained. Red color has not been discerned by the use of the existing EL element of which emission spectrum is shown for instance by the broken line 1 in FIG. 3. By the use of such EL element 10 as the backlight of the color liquid crystal display element 20, the red color can be conceived differently from other colors.

Furthermore, in order to express more naturally the red color, the red fluorescent pigment is preferably mixed in the range of 4 mass percent or more to the copper activated zinc sulfide phosphor. Thereby, furthermore preferable white light can be obtained. Specifically, the white light having, in the CIE chromaticity coordinates (x, y) of x from 0.32 to 0.42 and of y from 0.30 to 0.40 can be obtained. By the use of such white light, the red color can be expressed furthermore excellently. The more preferable chromaticity values of the white light are in the range of x from 0.34 to 0.41 and of y from 0.31 to 0.39.

A solid line 2 in FIG. 3 is an emission spectrum of the EL element 10 having the light-emitting layer 11 in which the rhodamine group pigment is mixed with a ratio of 4 mass percent to the blue green emitting copper activated zinc sulfide phosphor. A ratio of a peak value of the red emission to that of the blue green emission is 84 percent. In comparison with the emission spectrum of the solid line 1 in FIG. 3, it is understood that the red color can be expressed more excellently.

In addition, 1, 3 and 5 mass percent of the rhodamine group pigment are added to the copper activated zinc sulfide phosphor, respectively, to prepare the light-emitting layers 11. The EL elements having these light-emitting layers 11 each are measured of emission colors (x, y chromaticity coordinates). Results are shown in Table 1.

TABLE 1

| Ratio of fluorescent pigment in light-emitting layer (ratio to ZnS:Cu) | Emission color of light-emitting layer (CIE chromaticity coordinate) |
| --- | --- |
| 5 mass percent | (0.38, 0.38) |
| 3 mass percent | (0.32, 0.40) |
| 1 mass percent | (0.24, 0.42) |

As obvious from Table 1, it is found that the higher the content of the red fluorescent pigment is, the lower a color temperature is, that is, the more natural the white is. That is, when the red fluorescent pigment is mixed in the range of 4 mass percent or more to the copper activated zinc sulfide phosphor, more preferable white can be obtained. However, the red fluorescent pigment, when added excessively, tends to cause deterioration of the emission brightness. Accordingly, the fluorescent pigment is preferable to be added by 7 mass percent or less to the copper activated zinc sulfide phosphor. From Table 1, it is understood that when the mixing ratio of the rhodamine group fluorescent pigment is less than 3 mass percent, the practically usable white cannot be obtained.

The red fluorescent pigment, without restricting to a configuration of containing in the light-emitting layer 11 together with the copper activated zinc sulfide phosphor, may be formed in a pigment layer on a light-emitting surface side of the light-emitting layer 11 primarily containing for instance the copper activated zinc sulfide phosphor. An amount of formation of the red fluorescent pigment layer in that case follows that in the case of mixing in the light-emitting layer 11. Furthermore, in addition to mixing the red fluorescent pigment in the light-emitting layer 11, on the light-emitting surface side of the light-emitting layer 11, the red fluorescent pigment layer may be formed.

The aforementioned red fluorescent pigment is inferior in the luminous efficiency to the copper activated zinc sulfide phosphor. While on the other hand the desired white light can be obtained, there is the risk of deteriorating the brightness as the EL element 10. Accordingly, it becomes important that while intensifying the emission of the red component, the brightness as the light-emitting layer 11 as a whole is less deteriorated as far as possible. As such device, the EL element 10 of a configuration as shown in FIG. 4 for instance is effective.

Figure 4:
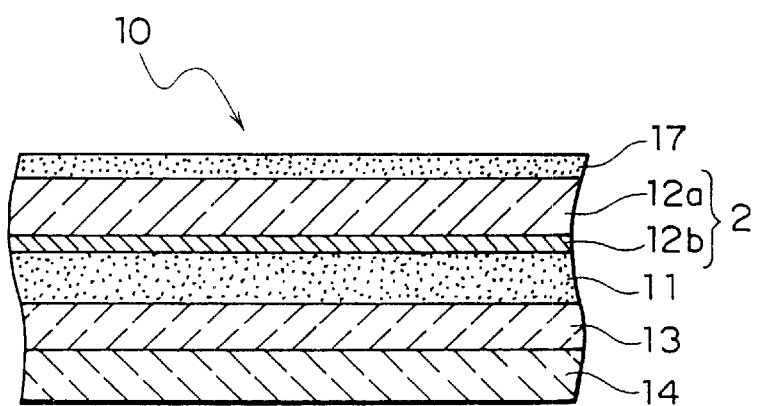
FIG. 4 is a sectional view showing another example of an essential configuration of an EL element used as a backlight for color liquid crystal.

The EL element 10 shown in FIG. 4 comprises, in addition to the light-emitting layer 11 containing the copper activated zinc sulfide phosphor and the red fluorescent pigment, the red fluorescent pigment layer 17 formed on a transparent electrode film 12. Thus, on the light-emitting surface side of the EL element 10, that is, on the transparent electrode film 12, the red fluorescent pigment layer 17 is furthermore disposed. Thereby, while obtaining the white light low in the color temperature and much in the red component, the EL element 10 can be prevented from deteriorating in the brightness. That is, when the red fluorescent pigment layer 17 is disposed on the light-emitting surface side, the brightness deterioration of the light-emitting layer 11 accompanying the increase of the content of the fluorescent pigment can be lessened.

As the specific configuration of the aforementioned EL element 10, it is preferable that the red fluorescent pigment of less than 2 mass percent to the copper activated zinc sulfide phosphor is added in the light-emitting layer 11, and the red fluorescent pigment constituting the fluorescent pigment layer 17 is added in the range from 2 mass percent or more and 5 mass percent or less to the copper activated zinc sulfide phosphor (copper activated zinc sulfide phosphor in the light-emitting layer 11).

Thus, by the use of less than 2 mass percent of the red fluorescent pigment with respect to the copper activated zinc sulfide phosphor in the light-emitting layer (phosphor layer) 11, the deterioration of luminous efficiency of the light-emitting layer 11 can be sufficiently suppressed. In addition to the above, by disposing the red fluorescent pigment layer 17 on the transparent electrode film 12, the natural white emission excellent in the brightness and low in the color temperature can be obtained. Specifically, the white light having the chromaticity coordinate values (x, y) of x from 0.32 to 0.42 and of y from 0.30 to 0.40 in the CIE chromaticity coordinate can be obtained. The more preferable chromaticity values of the white light are in the range of x from 0.34 to 0.41 and of y from 0.31 to 0.39.

That is, when comparing the cases where the contents of the rhodamine group fluorescent pigment in the whole element is the same (one in which the red fluorescent pigment is present only in the light-emitting layer 11, and the other one in which in addition to the above, the red fluorescent pigment layer 17 is disposed), the light-emitting layer 11 that concurrently uses the red fluorescent pigment layer 17 shows remarkably larger x value in the CIE chromaticity coordinate (x, y) of the emission color, the red color low in the color temperature. In other words, at the equivalent brightness, the white emission low in the color temperature and much in the red component can be obtained. Furthermore, since the red fluorescent pigment layer 17 is disposed on the transparent electrode film 12, the red color can be furthermore enhanced.

As to the improvement of the emission color of the EL element 10, it is also effective to compound, in addition to the blue green emitting copper activated zinc sulfide phosphor, a blue emitting copper activated zinc sulfide phosphor to the light-emitting layer 11. Thereby, the white emission more excellent in color reproducibility can be obtained. The blue emitting copper activated zinc sulfide phosphor alone may be used. The emission brightness of the blue emitting copper activated zinc sulfide phosphor is also preferable to be the same with the case of the blue green emitting copper activated zinc sulfide phosphor. At that time, the y values of the CIE chromaticity coordinate (x, y) of the emission colors of the blue green and blue emitting zinc sulfide phosphors are preferable to be 0.38 or more and less than 0.38, respectively.

The emission color of the copper activated zinc sulfide phosphor can be controlled by an amount of activator copper. For instance, when copper is contained in the range from 0.055 to 0.07 mass percent to a phosphor host consisting of ZnS, the blue green emission as mentioned above can be obtained. Furthermore, when the amount of the activator copper to the phosphor host (ZnS) is less than 0.055 percent, the aforementioned blue emission can be obtained.

The brightness and chromaticity of the emission of the EL element (including the brightness and chromaticity of the emission of the copper activated zinc sulfide phosphor) in the present invention denote the values measured in the following ways. First, an EL element is turned on under the conditions of 100 Vrms and 400 Hz. Then, a Minoruta Color Meter (CS-100) is disposed so that its measuring portion comes to a distance of 210 mm from a center of an EL panel being turned on. Brightness and chromaticity are measured at 30 sec after a voltage is applied. Measurement is carried out in a dark room from 15 to 25° C.

The EL phosphor particles, more specifically, the copper activated zinc sulfide phosphor particles, primarily constituting the light-emitting layer 11 of the EL element 10, is weak to moisture to be easily deteriorated in the characteristics (brightness or the like) due to the moisture in the air. Accordingly, in the EL element 10 of the present invention, it is preferable to use the EL phosphor particles covered by an essentially transparent moisture-proof film, so-called EL phosphor particles with moisture-proof film.

As the moisture-proof film of the EL phosphor particles, metal oxide film for instance can be used. Though the kind of the metal oxide is not particularly restricted, in view of moisture-proof, light transparency, and insulating property, at least one kind selected from silicon oxide (SiO$_x$), titanium oxide (TiO$_x$), and aluminum oxide (AlO$_x$) can be preferably employed. The moisture-proof film is not necessarily restricted to the metal oxide, but non-oxide group compounds also can be used. As the non-oxide group moisture-proof film, silicon nitride (SiN$_x$) and aluminum nitride (AlN) can be cited.

The moisture-proof film consisting of the metal oxide or the like, making allowance for uniformity of the film and costs, is preferably formed by means of chemical vapor deposition (CVD method). In particular, taking the brightness deterioration of the EL phosphor due to heating, film formation property on powder surface in a fluid state, and furthermore environmental safety during mass production into consideration, it is desirable to make use of, with material of no risk of explosion and inflammability, reaction system high in reactivity at low temperatures (200° C. or less). As such reaction systems, $SiCl_4+2H_2O \rightarrow SiO_2+4HCl$, and $TiCl_4+2H_2O \rightarrow TiO_2+4HCl$ can be cited.

A thickness of the moisture-proof film as mentioned above is preferable to be in the range from 0.1 to 1.0 $\mu$m by an average thickness. When the average thickness of the moisture-proof film is less than 0.1 $\mu$m, there is the risk of not obtaining sufficient moisture-proof effect. On the other hand, when the average thickness of the moisture-proof film exceeds 1.0 $\mu$m, not withstanding an essentially transparent moisture-proof film, there is the risk of deteriorating the emission brightness due to light absorption such as reflection and refraction.

The deterioration of the copper activated zinc sulfide phosphor due to the moisture can be also prevented from occurring by covering the whole EL element 10 with a moisture-proof film (polychlorotetrafluoroethylene film or the like). However, in addition to raising the manufacturing cost, a thickness of the EL element 10 itself also becomes thicker. On the other hand, according to the light-emitting layer 11 containing the EL phosphor particles with the moisture-proof film, the EL phosphor particles themselves have moisture-proof property. Accordingly, without using the moisture-proof film or moisture-absorbing film, the EL element 10 (hereafter refers to as a bare EL element) in which characteristics deterioration of the EL phosphor due to the moisture is suppressed can be configured.

In the bare EL element 10, the rear electrode layer 13 is constituted of a coating layer of metal powder such as Ag powder or Cu powder, carbon powder such as graphite powder, or a mixture thereof. That is, on the transparent electrode film 12 the light-emitting layer 11 is coated, furthermore thereon 11 a reflective insulating layer 13 and the rear electrode layer 14 are coated in turn. A stacked body consisting of these transparent electrode film 12, the light-emitting layer 11, the reflective insulating layer 13 and the rear electrode layer 14 is integrated into one body by means of the thermocompression bonding. From such stacked body (thermocompression body), the bare EL element 10 is configured.

To the transparent electrode 12b and the rear electrode layer 14 of the EL element 10, as shown in FIG. 1, leads 15a and 15b are attached respectively, therethrough 15a and 15b an alternating voltage (electric field) is applied from an AC power source 16. Thus, to the light-emitting layer 11 an electric field is applied through the transparent electrode 12b and the rear electrode layer 14. Thereby, the light-emitting layer 11 of the EL element 10 emits in white. As the AC power source 16, it is preferable to use an inverter having an output of 150 Vpp or more and 300 Hz or more. Thereby, the brightness of white emission of the EL element 10 can be furthermore improved.

The white light emitted from the light-emitting layer 11 of the EL element 10 is guided to the transmission type or reflection type color liquid crystal display element 20, thereby as the color liquid crystal display device 30 a full-color image display being realized. For the color liquid crystal display element 20, one of general configuration is used. That is, for instance a first transparent substrate having for instance a common transparent electrode and a second transparent substrate having the respective pixel electrodes of RGB are oppositely disposed a prescribed gap apart. Between these transparent substrates liquid crystal is filled, and for the first transparent substrate the color liquid crystal display device 20 thereon a color filter film is formed is used. For driving the color liquid crystal display element 20, various kinds of driving modes such as simple matrix drive, active matrix drive by the use of TFT or TFD can be applied.

In order to improve utilization efficiency of the white light emitted from the light-emitting layer 11, it is effective to dispose, between the EL element 10 and the color liquid crystal display element 20, a reflective optical retardation film 40 or the like. The reflective optical retardation film 40 allows the white light emitted from the light-emitting layer 11 to go through according to an axis of polarization of the color liquid crystal, and reflects the light of different axis of polarization to re-reflect by the backlight to reuse. In employing such reflective optical retardation film 40, the EL element 10 as the backlight, being excellent in reflectance, can furthermore effectively obtain an improvement effect of the light utilization efficiency due to the reflective optical retardation film 40.

As mentioned above, the EL element according to the present invention satisfies sufficiently characteristics such as the reproducibility of the white light and the brightness required for the backlight for the color liquid crystal display element. As a result, according to the backlight for the color liquid crystal comprising such EL element, high performance full-color display due to the color liquid crystal display element can be realized. In other words, it largely contributes in putting into practical use the color liquid crystal display device that employs the EL element as the backlight.

In addition to the above, by making the best use of the characteristics that the EL element is small and thin to be excellent in space saving and low in consumption power, the color liquid crystal display device that is smaller and thinner in size and lower in consumption power can be realized. Furthermore, the EL element, being a surface light source, does not cause unevenness of display and light leakage. Accordingly, display characteristics of the color liquid crystal display device can be furthermore heightened.

The color liquid crystal display device of the present invention, in addition to materializing to be smaller and thinner, realizes lower consumption power, longer life, prevention of uneven display and light leakage, and furthermore an improvement of display characteristics such as color reproducibility and brightness. The lower consumption power of the color liquid crystal display device 30 is effective particularly in display portions of portable information terminals such as PDA's, portable telephones, and various kinds of game machines. Thus, the backlight for color liquid crystal of the present invention and the color liquid crystal display device therewith are suitable for the display portion of the portable information terminal.

In the following, specific embodiments of the present invention and evaluation results thereof will be explained.

Embodiment 1

First, 96 mass percent of blue green emitting ZnS: Cu phosphor powder with moisture-proof film consisting of alumina film and 4 mass percent of rhodamine group fluorescent pigment that is a red fluorescent pigment are mixed. Thus obtained mixture is dispersed in fluororubber together with an appropriate amount of organic solvent to prepare slurry. Then, on a transparent electrode film that is formed by depositing an ITO film on a polyester film, the aforementioned phosphor slurry is screen-printed to form a light-emitting layer of a thickness of 50 $\mu$m.

The ZnS: Cu phosphor used here contains 0.06 mass percent of Cu with respect to ZnS, and has, under the operational conditions of a voltage of 100 Vrms and a frequency of 400 Hz, emission brightness of 110 cd/m$^2$ and chromaticity of (0.18, 0.38) by the CIE chromaticity coordinate. The brightness and chromaticity of the ZnS: Cu phosphor are measured based on the aforementioned method.

Next, on the aforementioned light-emitting layer, according to the ordinary method, a reflective insulating layer and a rear electrode layer are stacked in turn. Thus, a bare EL element is prepared. The obtained bare EL element has luminous efficiency of consumption power of 20 W/m$^2$ or less. The EL element for the backlight of color liquid crystal is provided for performance evaluation described below.

Embodiment 2

First, 99.5 mass percent of the same blue green emitting ZnS: Cu phosphor powder with Embodiment 1 and 0.5 mass percent of rhodamine group fluorescent pigment, a red fluorescent pigment, are mixed. The above mixture is dispersed in fluororubber together with an appropriate amount of organic solvent to prepare slurry. Then, on a transparent electrode film that is formed by depositing an ITO film on a polyester film, the aforementioned phosphor slurry is screen-printed to form a light-emitting layer of a thickness of 50 $\mu$m.

Next, on the aforementioned light-emitting layer, by the use of an ordinary method, a reflective insulating layer and a rear electrode layer are stacked in turn. Thereafter, a fluorescent pigment layer containing 3 mass percent of rhodamine group fluorescent pigment with respect to the phosphor powder of the light-emitting layer is printed on the transparent electrode layer to form a color filter layer. Thus obtained bare EL element has a luminous efficiency of consumption power of 20 W/m$^2$ or less. The EL element for the backlight for color liquid crystal is provided for performance evaluation described below.

Embodiment 3

First, 99 mass percent of blue emitting ZnS: Cu phosphor powder with moisture-proof film consisting of alumina film and 1 mass percent of rhodamine group fluorescent pigment, a red fluorescent pigment, are mixed. The above mixture is dispersed in fluororubber together with an appropriate amount of organic solvent to prepare slurry. Then, on a transparent electrode film that is formed by depositing an ITO film on a polyester film, the aforementioned phosphor slurry is screen-printed to form a light-emitting layer of a thickness of 50 $\mu$m.

The ZnS: Cu phosphor used here contains 0.05 mass percent of Cu with respect to ZnS, and has, under the operational conditions of a voltage of 100 Vrms and a frequency of 400 Hz, emission brightness of 102 cd/m$^2$ and chromaticity of (0.179, 0.35) by the CIE chromaticity coordinate. The brightness and chromaticity of the ZnS: Cu phosphor are measured based on the aforementioned method.

Next, on the aforementioned light-emitting layer, according to the ordinary method, a reflective insulating layer and a rear electrode layer are stacked in turn. Thereafter, a fluorescent pigment layer containing 4 mass percent of rhodamine group fluorescent pigment with respect to the phosphor powder of the light-emitting layer is printed on the transparent electrode layer to form a color filter layer. Thus obtained bare EL element has a luminous efficiency of consumption power of 20 W/m$^2$ or less. The EL element for the backlight for color liquid crystal is provided for performance evaluation described below.

Embodiment 4

49.5 mass percent of the same blue green emitting ZnS: Cu phosphor powder with Embodiment 1, 49 mass percent of the same blue emitting ZnS: Cu phosphor powder with Embodiment 3 and 1.5 mass percent of rhodamine group fluorescent pigment, a red fluorescent pigment, are mixed. The above mixture is dispersed in fluororubber together with an appropriate amount of organic solvent to prepare slurry. Then, on a transparent electrode film that is formed by depositing an ITO film on a polyester film, the aforementioned phosphor slurry is screen-printed to form a light-emitting layer of a thickness of 50 μm.

Next, on the aforementioned light-emitting layer, according to an ordinary method, a reflective insulating layer and a rear electrode layer are stacked in turn. Thereafter, a fluorescent pigment layer containing 5 mass percent of rhodamine group fluorescent pigment with respect to the phosphor powder of the light-emitting layer is printed on the transparent electrode layer to form a color filter layer. Thus obtained bare EL element has luminous efficiency of consumption power of 20 W/m$^2$ or less. The EL element for the backlight for color liquid crystal is provided for performance evaluation described below.

COMPARATIVE EXAMPLE 1

Except for a mixing ratio of rhodamine group fluorescent pigment being altered to 1 mass percent, similarly with Embodiment 1, a bare EL element is prepared. Thus obtained EL element is also provided for performance evaluation described below.

COMPARATIVE EXAMPLE 2

Except for the use of ZnS: Cu phosphor (blue green emitting) that shows brightness of 60 cd/m$^2$ under the operational conditions of a voltage of 100 Vrms and a frequency of 400 Hz, similarly with Embodiment 1, a bare EL element is prepared. Thus obtained EL element is also provided for performance evaluation described below.

The EL elements for the backlight of color liquid crystal according to the above Embodiments 1 through 4 and Comparative Examples 1 through 2 are measured of brightness and chromaticity according to the aforementioned method. In driving the EL element, an inverter having an output of 150 Vpp or more and 300 Hz or more is used for a driving power source. These results are shown in Table 2.

TABLE 2

| | EL element | |
|---|---|---|
| | Emission brightness at 100 V and 400 Hz (cd/m$^2$) | Emission color (CIE chromaticity coordinate) |
| Embodiment 1 | 95 | (0.34, 0.36) |
| Embodiment 2 | 90 | (0.40, 0.35) |
| Embodiment 3 | 85 | (0.42, 0.32) |
| Embodiment 4 | 80 | (0.41, 0.33) |
| Comparative Example 1 | 100 | (0.24, 0.38) |
| Comparative Example 2 | 50 | (0.34, 0.35) |

As obvious from Table 2, it is found that all of the EL elements according to Embodiments 1 through 4 have enough brightness and chromaticity as the backlight for the color liquid crystal display device in comparison with Comparative Examples 1 and 2.

Next, with the EL elements of the aforementioned Embodiments 1 through 4 each as the backlight, the color liquid crystal display devices (dimension: 70×70 mm) of which configuration is shown in FIG. 1 are assembled, respectively, followed by image display test. It is confirmed that all of the above display devices are capable of showing excellent full-color display. The color liquid crystal display devices each are free from display unevenness and light leakage, and are excellent in display performance such as color reproducibility and brightness.

As obvious from the above Embodiments, according to the present invention, in addition to enabling to realize full-color display due to the liquid crystal display device, the backlight for color liquid crystal that is small and thin to be excellent in space saving, low in power consumption, and free from display unevenness and light leakage can be provided. Such backlight for color liquid crystal of the present invention largely contributes in making the color liquid crystal display device smaller and thinner in size, lower in power consumption, and excellent in display performance.

While the invention has been described in terms of specific embodiments thereof, it is not intended to be limited thereto but rather only to the extent set forth hereafter in the following claims.

What is claimed is:

1. A backlight for color liquid crystal, comprising:
    a light-emitting layer having EL phosphor particles dispersed in a matrix of dielectrics;
    a transparent electrode layer disposed along a main surface on an emitting side of the light-emitting layer; and
    a reflective insulating layer and a rear electrode layer stacked in turn along a main surface on a non-emitting side of the light-emitting layer;
    wherein the EL element, under the operational conditions of a voltage of 100 Vrms and a frequency of 400 Hz, emits white light of which brightness is 80 cd/m$^2$ or more and that has a luminous efficiency of consumption power of 30 W/m$^2$ or less.

2. The backlight for color liquid crystal as set forth in claim 1:
    wherein the white light has CIE chromaticity coordinate values (x, y) of x from 0.30 to 0.43 and of y from 0.27 to 0.41.

3. The backlight for color liquid crystal as set forth in claim 1:
    wherein the EL phosphor comprises a blue green or blue emitting copper activated zinc sulfide phosphor, the copper activated zinc sulfide phosphor, under the operational conditions of a voltage of 100 Vrms and a frequency of 400 Hz, having brightness of 100 cd/m$^2$ or more.

4. The backlight for color liquid crystal as set forth in claim 3:
    wherein the light-emitting layer of the EL element comprises the aforementioned blue green or blue emitting copper activated zinc sulfide phosphor particles, and a fluorescent pigment that absorbs emission from the copper activated zinc sulfide phosphor to emit in red and is contained by 3 mass percent or more with respect to the copper activated zinc sulfide phosphor.

5. The backlight for color liquid crystal as set forth in claim 4:
    wherein the light-emitting layer comprises the fluorescent pigment of 4 mass percent or more and 7 mass percent or less with respect to the copper activated zinc sulfide phosphor.

6. The backlight for color liquid crystal as set forth in claim 5:

wherein the EL element, under the aforementioned operational conditions, emits white light having CIE chromaticity coordinate values (x, y) of x from 0.32 to 0.42 and y from 0.30 to 0.40.

7. The backlight for color liquid crystal as set forth in claim 3:

wherein the light-emitting layer of the EL element comprises the aforementioned blue green or blue emitting copper activated zinc sulfide phosphor particles and a fluorescent pigment that absorbs emission from the copper activated zinc sulfide phosphor to emit in red and is contained by less than 2 mass percent with respect to the copper activated zinc sulfide phosphor, and furthermore the EL element comprises a red pigment layer that is stacked on a transparent electrode film thereon the transparent electrode layer is formed and contains the fluorescent pigment of 2 mass percent or more and 5 mass percent or less with respect to the aforementioned copper activated zinc sulfide phosphor in the light-emitting layer.

8. The backlight for color liquid crystal as set forth in claim 7:

wherein the EL element, under the aforementioned operational conditions, emits white light having CIE chromaticity coordinate values (x, y) of x from 0.32 to 0.42 and of y from 0.30 to 0.40.

9. The backlight for color liquid crystal as set forth in claim 3:

wherein the copper activated zinc sulfide phosphor has an emission color having CIE chromaticity coordinate values (x, y) of x from 0.17 to 0.19 and of y from 0.35 to 0.47.

10. The backlight for color liquid crystal as set forth in claim 5:

wherein the light-emitting layer comprises blue green emitting copper activated zinc sulfide phosphor particles having CIE chromaticity coordinate value (x, y) of y of 0.38 or more, and blue emitting copper activated zinc sulfide phosphor particles having CIE chromaticity coordinate value (x, y) of y of less than 0.38.

11. The backlight for color liquid crystal as set forth in claim 1, further comprising:

as a drive source of the EL element, an inverter having an output of 150 Vpp or more and 300 Hz or more.

12. The backlight for color liquid crystal as set forth in claim 1:

wherein the light-emitting layer of the EL element comprises the EL phosphor particles covered by an essentially transparent moisture-proof film.

13. A color liquid crystal display device, comprising:

the backlight for color liquid crystal set forth in claim 1; and a transparent or semi-transparent color liquid crystal display element disposed on a light-emitting surface side of the backlight.

14. The color liquid crystal display device as set forth in claim 13, further comprising:

a reflective optical retardation film that is disposed between the backlight and the color liquid crystal display element and enhances utility efficiency of white light emitted from the EL element.

15. The color liquid crystal display device as set forth in claim 13:

wherein the backlight, as a drive source of the EL element, further comprises an inverter having an output of 150 Vpp or more and 300 Hz or more.

16. An EL element for a backlight of color liquid crystal, comprising:

a light-emitting layer having EL phosphor particles dispersed in a matrix of dielectrics;

a transparent electrode layer disposed along a main surface on an emitting side of the light-emitting layer; and a reflective insulating layer and a rear electrode layer stacked in turn along a main surface on a non-emitting side of the light-emitting layer;

wherein the EL element, under the operational conditions of a voltage of 100 Vrms and a frequency of 400 Hz, emits white light of which brightness is 80 cd/m$^2$ or more and has a luminous efficiency of consumption power of 30 W/m$^2$ or less.

* * * * *

UNITED STATES PATENT AND TRADEMARK OFFICE
CERTIFICATE OF CORRECTION

PATENT NO.    : 6,580,224 B2
DATED         : June 17, 2003
INVENTOR(S)   : Tsutomu Ishii, Mitsuo Nakamura and Kiyoshi Inoue It is certified that error appears in the above-identified patent and that said Letters Patent is hereby corrected as shown below:

Column 9,
Line 54, "Siox," should read -- $SiO_x$ --;

Column 10,
Line 3, "(200° C. or " should read -- (200° C or --.

Signed and Sealed this

Twenty-seventh Day of July, 2004

JON W. DUDAS
*Acting Director of the United States Patent and Trademark Office*